United States Patent [19]

Belart

[11] 4,214,448
[45] Jul. 29, 1980

[54] HYDRAULIC BRAKE BOOSTER

[75] Inventor: Juan Belart, Walldorf, Fed. Rep. of Germany

[73] Assignee: ITT Industries, Inc., New York, N.Y.

[21] Appl. No.: 916,632

[22] Filed: Jun. 19, 1978

[30] Foreign Application Priority Data

Jul. 30, 1977 [DE] Fed. Rep. of Germany ....... 2734471

[51] Int. Cl.² ............................................. B60T 13/00
[52] U.S. Cl. ............................... 60/547 R; 60/547 A; 60/547 B; 91/450; 91/513
[58] Field of Search ............. 60/547 R, 547 A, 547 B, 60/548, 552, 553, 554; 91/391 R, 450, 513

[56] References Cited

U.S. PATENT DOCUMENTS

| | | | |
|---|---|---|---|
| 3,714,869 | 2/1973 | Flory | 91/391 R |
| 3,782,781 | 1/1974 | Lewis | 60/547 B |
| 3,817,037 | 6/1974 | Belart | 60/552 |
| 3,831,491 | 8/1974 | Thomas | 91/391 R |
| 3,851,473 | 12/1974 | Bainbridge | 60/552 |

*Primary Examiner*—Abraham Hershkovitz
*Attorney, Agent, or Firm*—John T. O'Halloran; Alfred C. Hill

[57] ABSTRACT

There is disclosed a hydraulic brake booster comprising a valve spool providing for alternate connection of a booster chamber with a source of pressure-transmitting fluid and an unpressurized return reservoir. The source of pressure-transmitting fluid is a pump-circulated fluid adapted to be throttled by a mechanically actuatable throttle valve arranged coaxially with the valve spool. Since the throttle valve is actuated independently of the pressure in the booster chamber, the need to produce a supply pressure when the brake is not actuated is eliminated. The pump is subjected to load only during the relatively short period of brake activation.

7 Claims, 1 Drawing Figure

U.S. Patent    Jul. 29, 1980    4,214,448
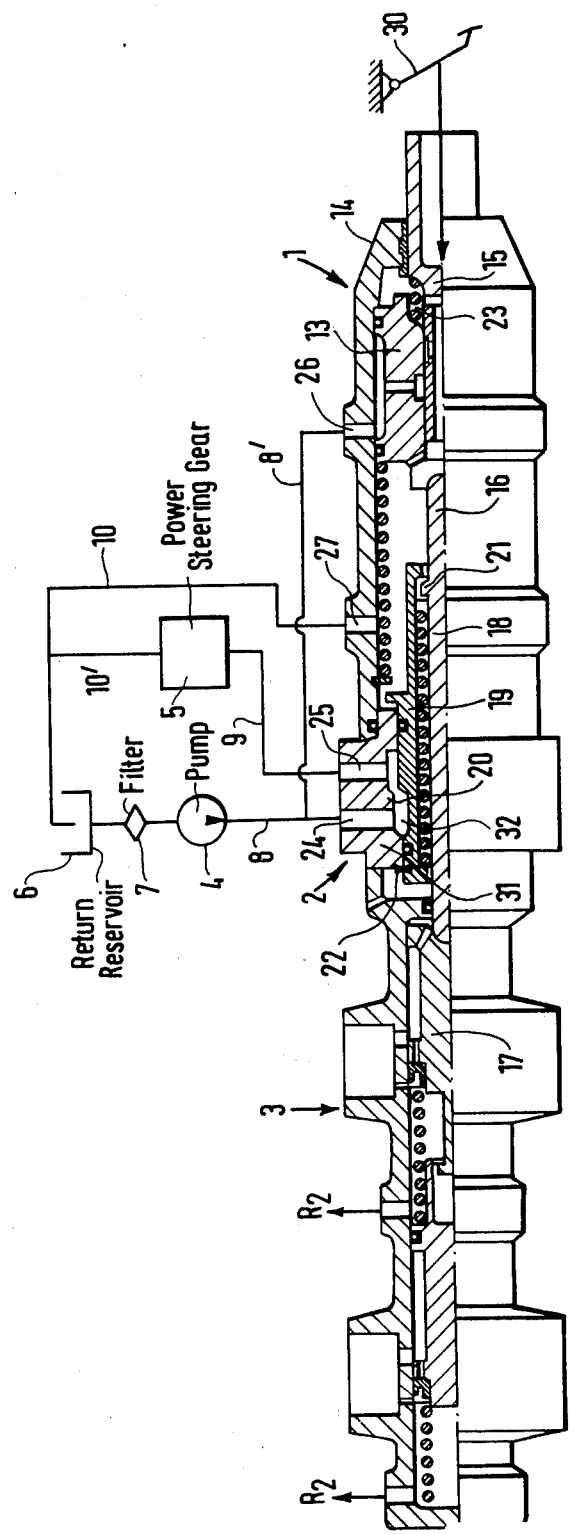

HYDRAULIC BRAKE BOOSTER

BACKGROUND OF THE INVENTION

This invention relates to a hydraulic brake booster having a booster piston forming on the side close to a brake pedal a boundary for a booster chamber and further including a valve spool which is slidable by means of the brake pedal to provide for alternate connection of the booster chamber with a source of pressure-transmitting fluid and with an unpressurized return reservoir, wherein the source of pressure-transmitting fluid is a pump-circulated fluid adapted to be throttled by a controlled flow-control valve, and wherein the booster piston is adapted to activate a static master cylinder via a push rod. Such a brake booster is known from the German laid open printed application DT-OS No. 2,434,236 published Feb. 6, 1975.

In the known brake booster, the flow-control valve is disposed in parallel with the booster piston, and a valve member of the flow-control valve is biassed in the closing direction by means of a spring. As a result of this bias, the pump-circulated fluid is continuously throttled so that there is at all times a low pressure head that can be metered into the booster chamber through the valve spool. In addition to the spring, the pressure in the booster chamber is adapted to act upon the valve member so that, during building up of pressure in the booster chamber, the valve member is urged into the closing direction to a greater degree, whereby the throttling of the pump-circulated fluid is augmented which results in a correspondingly increased pressure head. Thus, in the known brake booster, the pressure head generated lies always above the pressure in the booster chamber by the degree determined by the spring.

The disadvantage of this arrangement is that a continuous power loss has to be put up with even when the brake is not activated. It is to be considered also that the operating time of the vehicle is a multiple of the times in which the brake is activated and in which a pressure head is required. In addition to the continuous power loss, it is another disadvantage therein that the pressure fluid keeps being heated up because of the continuous throttling. This necessitates additional cooling installations in the pressure transmitting fluid circuit.

SUMMARY OF THE INVENTION

It is, therefore, an object of the present invention to provide a brake booster of the type initially referred to so that the pump-circulated fluid is throttled only when the brake is activated.

A feature of the present invention is the provision of a hydraulic brake booster comprising: a housing having a longitudinal axis; a booster piston disposed in and slidably sealed to an inner surface of the housing coaxial of the axis, one end of the booster piston adjacent a brake pedal providing a boundary for a booster chamber; a valve spool disposed within and slidably sealed to an inner surface of the booster piston, the valve spool being slidable by the brake pedal to provide alternate connection of the booster chamber with a source of pressure-transmitting fluid and an unpressurized return reservoir, the source of pressure-transmitting fluid being a pump circulating a brake fluid; a static master cylinder having a master piston disposed within the housing coaxial of the axis spaced from the other end of the booster piston, the master cylinder being activated by the booster piston through a push rod disposed within the housing coaxial of the axis; and a controlled flow-control valve disposed within the housing coaxial of the axis between the booster piston and the master cylinder, the control valve including a valve member disposed within the housing and coaxially around the push rod, the push rod causing the valve member to be displaced mechanically in a direction towards the master cylinder to obtain throttling of the pump-circulated fluid.

The particular advantages of this arrangement are that the flow-control valve is activated independently of the pressure in the booster chamber. This eliminates the need for a supply pressure when the brake is not activated which avoids heating of the system and power losses during the inactive state of the brake. The pump is subjected to load by the brake booster only during the relatively short period of brake activation.

In an advantageous improvement of the present invention, the valve member is movable relative to the push rod and bears upon the push rod in the direction towards the master cylinder via a spring. In this arrangement, there is no need for the flow-control valve to be designed so it is effective over the full displacement travel of the push rod. If it is provided further that the valve member has a pressure-bearing surface adapted to have applied to it the throttled pump-circulated fluid in opposition to the spring force, the magnitude of the control pressure is independent of the actuating travel of the push rod and, as a result, is independent of the pressure in the booster chamber.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a partial longitudinal cross-sectional view of the brake booster in accordance with the principles of the present invention.

DESCRIPTION OF THE PREFERRED EMBODIMENT

In the FIGURE of the drawing, reference numeral 1 identifies a brake booster and reference numeral 3 a static master cylinder connected therewith. Disposed between the brake booster 1 and the master cylinder 3 is a flow-control valve 2. A hydraulic system communicating with the flow-control valve 2 and the brake booster 1 is shown schematically.

The hydraulic system includes a pump 4 which communicates on the pressure side with an inlet of the flow-control valve 2 through a conduit 8 and with an inlet port 26 of the brake booster 1 through a conduit 8' branching off from the conduit 8. Through a conduit 9, an outlet 25 of the flow-control valve 2 communicates with a power steering gear 5 operating according to the circulation principle. The power steering gear 5 and an outlet port 27 of the brake booster 1 communicate with a return reservoir 6 via conduits 10 and 10'. The return reservoir 6 communicates with the suction side of the pump 4 through a filter 7.

The brake booster 1 has a booster piston 13 forming a boundary for a booster chamber 14 on the right-hand side close to the brake pedal 30, viewing the drawing. A valve spool 15 slidable in the booster piston 13, extends outwardly through the booster chamber 14, and is actuatable by means of brake pedal 30 schematically shown.

A spring 23 is engaged between the valve spool 15 and the booster piston 13. In a known manner, the booster piston 13 and the valve spool 15 include channels and control shoulders so that in the normal position the booster chamber 14 communicates with the outlet port 27 and pressure fluid is metered into the booster chamber 14 from the inlet port 26 in the activated position, in dependence on the actuating force, whereby the booster piston 13 is acted upon by pressure in the operating direction.

The static master cylinder 3 has likewise a known structure and is suitably communicable with the wheel brakes of a vehicle. It includes a piston 17 actuated by the booster piston 13 through means of a push rod 16.

The flow-control valve 2 disposed between the brake booster 1 and the master cylinder 3 comprises a housing portion 31 and a valve member 19. The valve member 19 is slidable in the housing portion 31 and forms between two seals a boundary for a stepped chamber 32 which is formed as a result of the suitably stepped structures of the valve member 19 and the housing portion 31. The step at the valve member 19 presents a pressure-bearing surface 20 whose periphery forms a throttling shoulder cooperating with the housing portion 31 and adapted to separate the chamber 32. When pressure is applied to the surface 20, the valve member 19 will be urged to the right into the opening direction in opposition to the operating direction. The inlet 24 is disposed on the left, and the outlet 25 on the right of the step in the housing portion 31. The travel of displacement of the valve member 19 is limited in opposition to the direction of operation by a stop 22 formed solid with the housing. In the direction of operation, the displacement travel is limited by a stop 21 formed on the push rod 16. Disposed between the push rod 16 and the valve member 19 arranged coaxially therewith is a spring 18 bearing against the valve member 19 in the operating direction and against the push rod 16 in the opposite direction.

The mode of operation of the brake booster constructed in accordance with the principles of the present invention is the following:

With the brake in the de-energized state, all parts are in their illustrated positions. The pump 4 supplies pressure fluid through conduit 8 to inlet 24 and through chamber 32, outlet 25 and conduit 9 to the power steering gear 5 from where it reaches the return reservoir 6 via conduit 10' and 10. From the return reservoir 6 the pressure fluid is directed to the suction side of the pump 4 through the filter 7. When a pressure head is produced in conduits 8 and 9 as a result of the energization of the power steering gear 5, the pressure thereby generated is also communicated to the inlet port 26 through the conduit 8'. Because of the position of the valve spool 15, the pressure fluid is, however, not allowed to be directed into the booster chamber 14.

When the brake is applied by depressing the brake pedal 30, the valve spool 15 is shifted to the left. As a result of the action of spring 23, the booster piston 13, the push rod 16 and the piston 17 of the master cylinder 3 are also displaced until pressure starts building up in the master cylinder 3. The displacement of the push rod 16 also causes the valve member 19 to be shifted to the left via the spring 18, thereby throttling the pump circulated fluid in the chamber 32 and causing the resulting pressure head to be presented to the inlet port 26 via the conduit 8'. The magnitude of the pressure head is dependent on the displacement travel of the push rod 16 in combination with the characteristic of the spring 18 and the pressure-bearing surface 20. If the booster piston 13 encounters a predetermined force as a result of the resistance of the master cylinder 3 and the valve member 19, the spring 23 will be compressed and the valve spool 15 will be displaced relative to the booster piston 13. Pressure fluid is thereby metered from the inlet port 26 into the booster chamber 14 where a pressure responsive to the pedal force and the pedal travel is built up which urges and displaces the booster piston 13 into the operating direction correspondingly to obtain the brake boosting effect. With the shift movement into the operating direction continuing, the valve member 19 is subjected to increased pressure from the spring 18 so that the pressure head prevailing in chamber 32 will increase and cause a higher pressure to be presented to the inlet port 26 even if the brakes are applied to a greater degree. The extent of throttling of the pump circulated fluid is thus dependent on the degree of braking. However, the degree to which the pressure head is allowed to enter the booster chamber 14 is solely determined by the valve spool 15.

When the pedal 30 is released, the pressure fluid in the booster chamber 14 is returned to the return reservoir 6 through the outlet port 27 and the conduit 10. All parts are thus returned to their positions as illustrated. In the event of a failure of the pump 4, the master cylinder is activated by purely mechanical means, that means the valve spool 15 bears against the booster piston 13 whereby the force is transmitted from the pedal 30 to the piston 17 of the master cylinder 3 through the valve spool 13, the booster piston 13 and the push rod 16.

While I have described above the principles of my invention in connection with specific apparatus it is to be clearly understood that this description is made only by way of example and not as a limitation to the scope of my invention as set forth in the objects thereof and in the accompanying claims.

I claim:

1. A hydraulic brake booster comprising:
   a housing having a longitudinal axis;
   a booster piston disposed in and slidably sealed to an inner surface of said housing coaxial of said axis, one end of said booster piston adjacent a brake pedal providing a boundary for a booster chamber;
   a valve spool disposed within and slidably sealed to an inner surface of said booster piston, said valve spool being slidable by said brake pedal to provide alternate connection of said booster chamber with a source of pressure-transmitting fluid and an unpressurized return reservoir, said source of pressure-transmitting fluid being a pump circulating a brake fluid;
   a static master cylinder having a master piston disposed within said housing coaxial of said axis spaced from the other end of said booster piston, said master piston being activated by said booster piston through a push rod disposed within said housing coaxial of said axis; and
   a controlled flow-control valve disposed within said housing coaxial of said axis between said booster piston and said master cylinder, said flow control valve including
      a valve member disposed within said housing and coaxially around said push rod, said push rod causing said valve member to be displaced mechanically in a direction towards said master piston to obtain throttling of said pump-circulated fluid.

2. A hydraulic brake booster according to claim 1, wherein
said valve member is movable relative to said push rod and is movable by said push rod in a direction towards said master piston via a spring.

3. A hydraulic brake booster according to claim 2, wherein
said valve member includes a pressure-bearing surface having applied thereto said pump-circulated fluid in opposition to the force of said spring.

4. A hydraulic brake booster according to claim 3, wherein
said pressure-bearing surface is an annular surface formed by a step in said valve member, said annular surface having a throttling shoulder on the outer periphery thereof.

5. A hydraulic brake booster according to claim 2, wherein
the displacement of said valve member relative to said push rod in a direction toward said master piston is limited by a stop formed on the outer surface of said push rod.

6. A hydraulic brake booster according to claim 5, wherein
the displacement of said valve member relative to a portion of said housing in a direction towards said booster piston is limited by a stop formed in the inner surface of said portion of said housing.

7. A hydraulic brake booster according to claim 1, further including
a spring disposed within said housing coaxial of said axis between said valve spool and said booster piston, said spring being so dimensioned that said booster piston, at the commencement of a braking action when no substantial counter-force is applied to said booster piston from said master cylinder, is displaced mechanically at least to such an extent that said valve member reaches its closing position before said valve spool connects said booster chamber with said pump.

* * * * *